United States Patent
Umemura et al.

(10) Patent No.: US 8,851,512 B2
(45) Date of Patent: Oct. 7, 2014

(54) VIBRATION SUPPRESSION STRUCTURE FOR STEERING WHEEL

(71) Applicant: Toyoda Gosei Co., Ltd., Kiyosu (JP)

(72) Inventors: Norio Umemura, Kiyosu (JP); Tsutomu Ishii, Kiyosu (JP); Kosuke Shigeta, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 36 days.

(21) Appl. No.: 13/803,543

(22) Filed: Mar. 14, 2013

(65) Prior Publication Data
US 2013/0255435 A1 Oct. 3, 2013

(30) Foreign Application Priority Data
Mar. 30, 2012 (JP) ................. 2012-078736

(51) Int. Cl.
*B62D 1/11* (2006.01)
*B60R 21/203* (2006.01)
*B62D 7/22* (2006.01)

(52) U.S. Cl.
CPC ........... *B62D 1/11* (2013.01); *B60R 21/203* (2013.01); *B62D 7/222* (2013.01)
USPC ........................................... 280/731

(58) Field of Classification Search
USPC ......................................... 280/731
See application file for complete search history.

(56) References Cited

U.S. PATENT DOCUMENTS

| | | | |
|---|---|---|---|
| 6,554,312 B2 * | 4/2003 | Sakane et al. | 280/728.2 |
| 7,131,661 B2 * | 11/2006 | Webber et al. | 280/728.2 |
| 7,407,183 B2 * | 8/2008 | Ford et al. | 280/731 |
| 7,464,959 B2 * | 12/2008 | Pillsbury et al. | 280/731 |
| 7,621,560 B2 * | 11/2009 | Spencer et al. | 280/731 |
| 2004/0178611 A1 * | 9/2004 | Simpson | 280/731 |
| 2006/0175816 A1 * | 8/2006 | Spencer et al. | 280/731 |
| 2006/0197323 A1 * | 9/2006 | Pillsbury et al. | 280/731 |

FOREIGN PATENT DOCUMENTS

JP  2011-195048 A  10/2011

* cited by examiner

*Primary Examiner* — Toan To
(74) *Attorney, Agent, or Firm* — Posz Law Group, PLC (57) ABSTRACT

A vibration suppression structure for a steering wheel includes elastic support portions for elastically supporting an inflator of an airbag apparatus. Each elastic support portion is formed as a cylinder having an axis extending in the longitudinal direction of a steering shaft. At any cross section orthogonal to the axis, each elastic support portion has an outer periphery of the same oval or the same circle and an inner periphery of the same oval or the same circle. When the outer periphery is circular, the inner periphery is oval. When the inner periphery is circular, the outer periphery is oval.

5 Claims, 7 Drawing Sheets

VIBRATION SUPPRESSION STRUCTURE FOR STEERING WHEEL

BACKGROUND OF THE INVENTION

The present invention relates to a vibration suppression structure that is used in a steering apparatus of a transport vehicle such as a motor vehicle to suppress vibration of a steering wheel having an airbag device.

During high-speed running of a vehicle or idling of the vehicle engine, vibration transmitted to the steering wheel via the steering shaft may impair driver comfort. In this regard, techniques for suppressing steering wheel vibrations have been conventionally developed and proposed. One of such techniques uses a dynamic damper that includes a weight and an elastic member, with which the weight is supported by, for example, the metal core of a steering wheel. According to the technique, when vibration the frequency of which is equal to or close to the resonance frequency of the dynamic damper is transmitted to the dynamic damper from the steering wheel, the dynamic damper resonates to absorb vibration energy of the steering wheel. This suppresses the vibration of the steering wheel.

A typical steering wheel is equipped with an incorporated airbag apparatus for protecting the driver at a collision of the vehicle. An airbag apparatus has an airbag and an inflator for supplying gas to the airbag. At a vehicle collision, the airbag is inflated with the gas supplied by the inflator. The airbag receives the body of the driver, which acts to incline forward due to the impact of the collision, thereby restricting the forward inclination to protect the driver from the impact.

Since the airbag apparatus occupies a large part of the interior space of the steering wheel, it is difficult to incorporate the above described dynamic damper in recent steering wheels. In this regard, a structure has been proposed in which an inflator is elastically supported by a support member with elastic support portions made of, for example, rubber, so that the inflator functions as a damper mass of a dynamic damper, and the elastic support portions function as springs of the dynamic damper.

If cylindrical or conical tubular members are used as the elastic support portions, the outer periphery and inner periphery both form a circle in the cross section orthogonal to its axis. The distance between the outer periphery and inner periphery, that is, the thickness of each elastic support portion is uniform in any direction (radial direction) orthogonal to the axis of the elastic support portion. Accordingly, the resonance frequency of the dynamic damper is uniform in any radial direction of the elastic support portions.

Thus, in a case in which vibration of a specific frequency in a specific direction (for example, the up-down direction) is desired to be suppressed in a steering wheel, if the direction and frequency of the vibration desired to be suppressed are one direction and one frequency, the shape (the diameter, the height and the like) of the elastic support members can be relatively easily adjusted such that the resonance frequency of the dynamic damper matches the frequency of the vibration to be suppressed.

However, when vibrations of different frequencies are desired to be suppressed in two directions orthogonal to each other (for example, the up-down direction and the left-right direction), it is difficult to adjust the elastic support members such that the dynamic damper vibrates at the frequencies desired to be suppressed both in the two directions. This is because, as described above, the outer and inner peripheries of each elastic support portion both have a circular cross section, so that the resonance frequencies in the two directions are the same.

In this regard, Japanese Laid-Open Patent Publication No. 2011-195048 discloses a structure that includes elastic support portions located between an inflator and a support member. Each elastic support portion includes ribs and a damper main body having a cylindrical or conical tubular shape. Each rib extends from a part in the circumferential direction of the outer surface of the damper main body to contact or be close to at least one of the inflator and the support member.

According to the technique disclosed in Japanese Laid-Open Patent Publication No. 2011-195048, the rib interferes with one of the inflator and the support member that contacts or is close to the rib, so that the rigidity of the elastic support portion is increased. Therefore, the rigidity of each elastic support portion in the direction in which the ribs protrudes from the outer surface of the damper main body is greater than the rigidity in other directions. The dynamic damper vibrates at a higher frequency in the direction in which the ribs protrude than in other directions. Thus, by providing ribs projecting in directions of vibrations of relatively high target frequencies, vibrations of different frequencies can be suppressed in the two orthogonal directions.

However, the ribs disclosed in Japanese Laid-Open Patent Publication No. 2011-195048 only have limited effectiveness in increasing rigidity. Therefore, the frequencies of vibrations in two orthogonal directions to be suppressed cannot be differentiated over a certain limit.

SUMMARY OF THE INVENTION

Accordingly, it is an objective of the present invention to provide a vibration suppression structure for a steering wheel capable of suppressing vibrations of two largely different frequencies in directions orthogonal to each other.

To achieve the foregoing objective and in accordance with one aspect of the present invention, a vibration suppression structure for a steering wheel is provided. The steering wheel is rotated about a steering shaft having a longitudinal direction and incorporates an airbag apparatus including an airbag and an inflator for supplying gas to the airbag. The vibration suppression structure includes an elastic support portion for elastically supporting the inflator such that the inflator functions as a damper mass of a dynamic damper and the elastic support portion functions as a spring of the dynamic damper. The elastic support portion is formed as a cylinder having an axis extending in the longitudinal direction. At any cross section orthogonal to the axis, the elastic support portion has an outer periphery of the same oval or the same circle and an inner periphery of the same oval or the same circle. When the outer periphery is circular, the inner periphery is oval, and when the inner periphery is circular, the outer periphery is oval.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

A vibration suppression structure for a steering wheel incorporating an airbag apparatus according to one embodiment of the present invention will now be described with reference to FIGS. 1 to 9.

Figure 1:
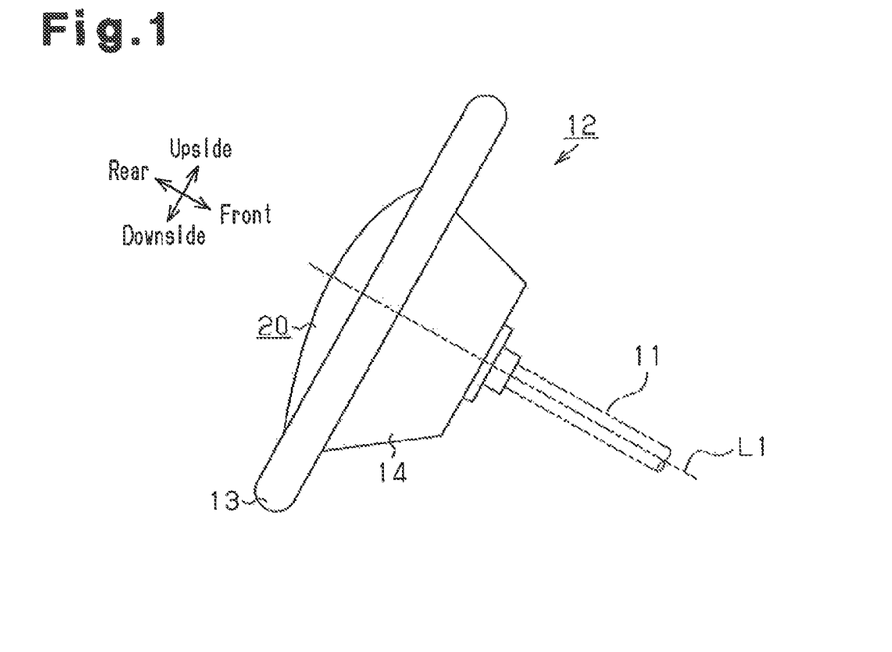
FIG. 1 is a side view illustrating a steering wheel according to one embodiment of the present invention.

As shown in FIG. 1, a steering shaft 11, which is rotated about a rotation axis L1, is arranged in front of the driver's seat of a vehicle. The rotation axis L1 is inclined such that the height of the steering shaft 11 is raised toward the driver's seat (toward the rear end of the vehicle, or toward left side as viewed in FIG. 1). A steering wheel 12 is attached to the rear end of the steering shaft 11 to be rotated integrally with the steering shaft 11.

In the following description on elements of the steering wheel 12, the terms relating to front, rear, up, and down are all defined using the rotation axis L1 of the steering shaft 11 as a reference. That is, the front-rear direction of the steering wheel 12 does not match with the front-rear direction of the vehicle, which is a horizontal direction, but matches with a direction along the rotation axis L1, which is the longitudinal direction of the steering shaft 11. Also, the up-down direction of the steering wheel 12 does not match with the up-down direction of the vehicle, which is a vertical direction, but matches with a direction that is orthogonal to both of the rotation axis L1 and the widthwise direction of the vehicle. On the other hand, the left-right direction of the steering wheel 12 matches with the widthwise direction (or the left-right direction) of the vehicle. However, in the following description on elements of the steering wheel 12, the terms relating to up, down, left, and right are all defined using, as a reference, a state of the steering wheel 12 when the vehicle is traveling in a straight line, that is, the neutral position of the steering wheel 12.

Figure 2:
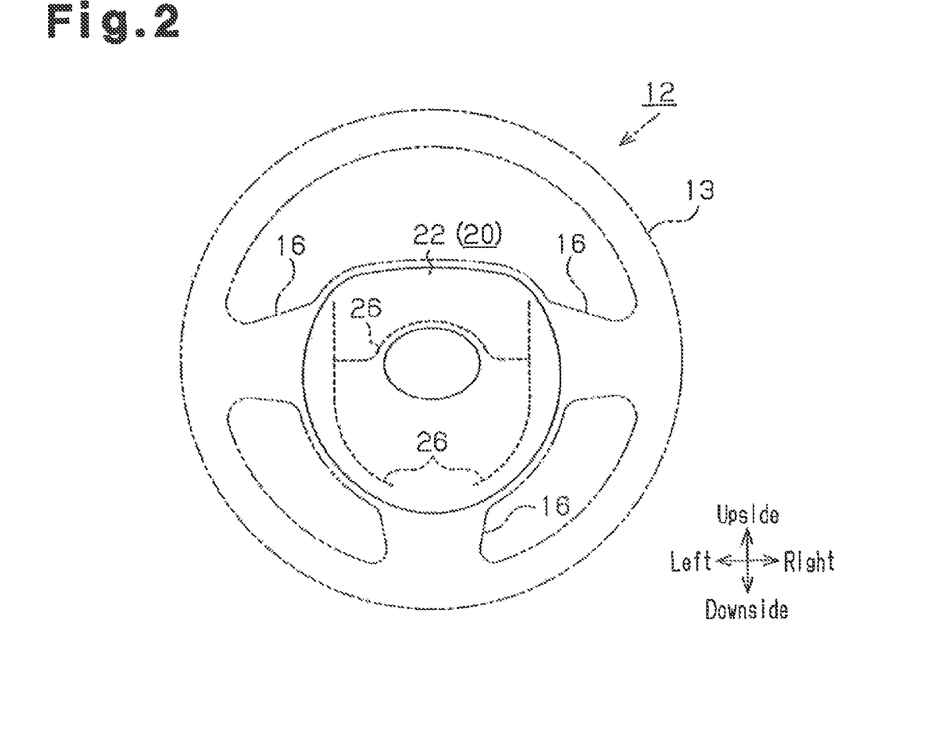
FIG. 2 is a front view illustrating the steering wheel.

As shown in FIGS. 1 and 2, the steering wheel 12 includes a rim portion (also referred to as a grip portion and a ring portion) 13, a pad cover 20, a lower cover 14, and spoke portions 16. The pad cover 20 and the lower cover 14 form a pad portion.

The rim portion 13 substantially has an annular shape the center of which coincides with the steering shaft 11. The pad cover 20 is located in a central part of the rim portion 13. The lower cover 14 is located in front of the pad cover 20 at the central part. The spoke portions 16 are formed between the rim portion 13 and the pad cover 20.

Figure 8:
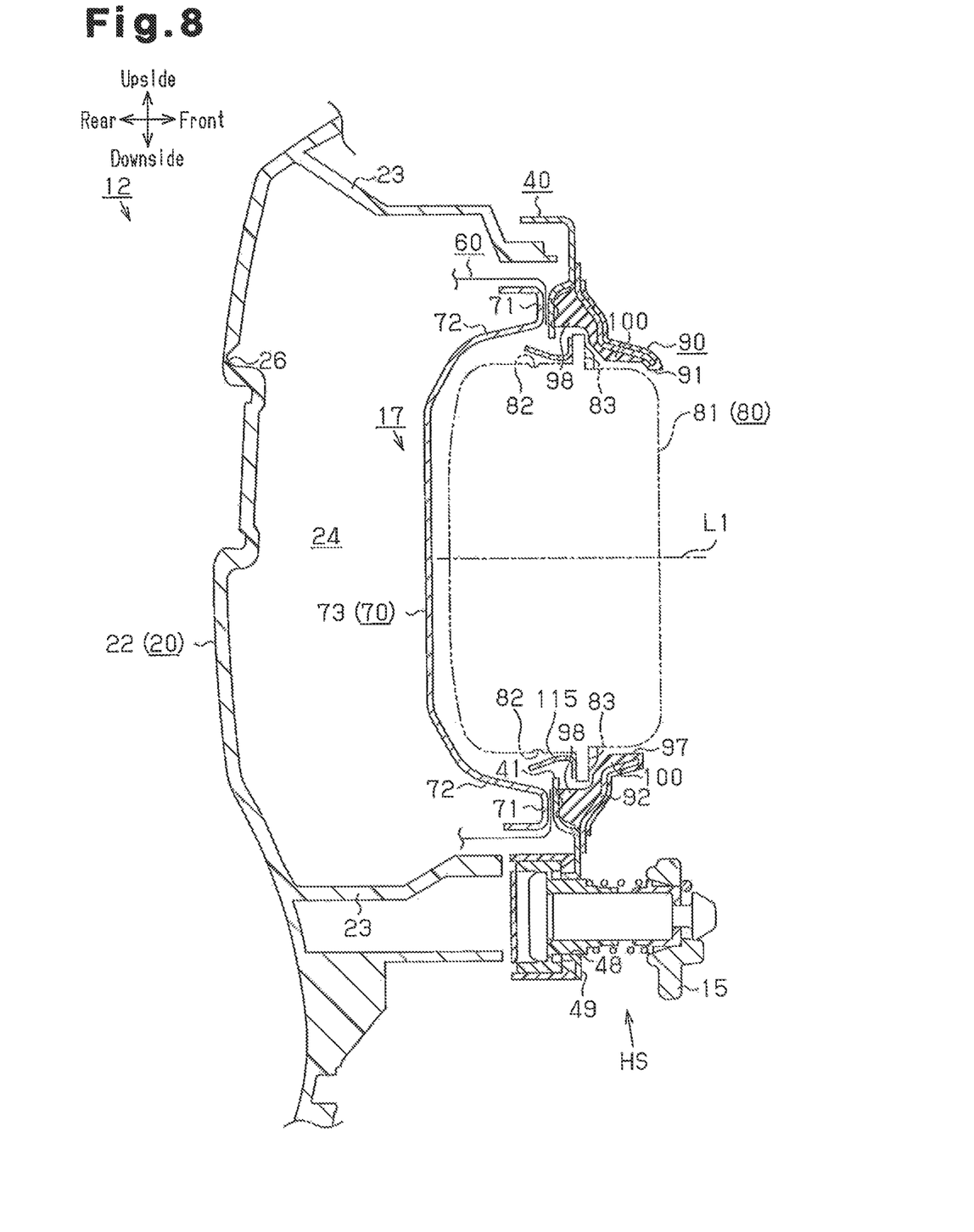
FIG. 8 is a cross-sectional view taken along line 8-8 of FIG. 3, illustrating the steering wheel.

A metal core 15, which is made of metal such as iron, aluminum, magnesium, or an alloy thereof, is arranged inside the rim portion 13 and the spoke portions 16 of the steering wheel 12 and in the space surrounded by the pad cover 20 and the lower cover 14 (see FIG. 8). The core 15 forms a framework of the steering wheel 12.

Figure 3:
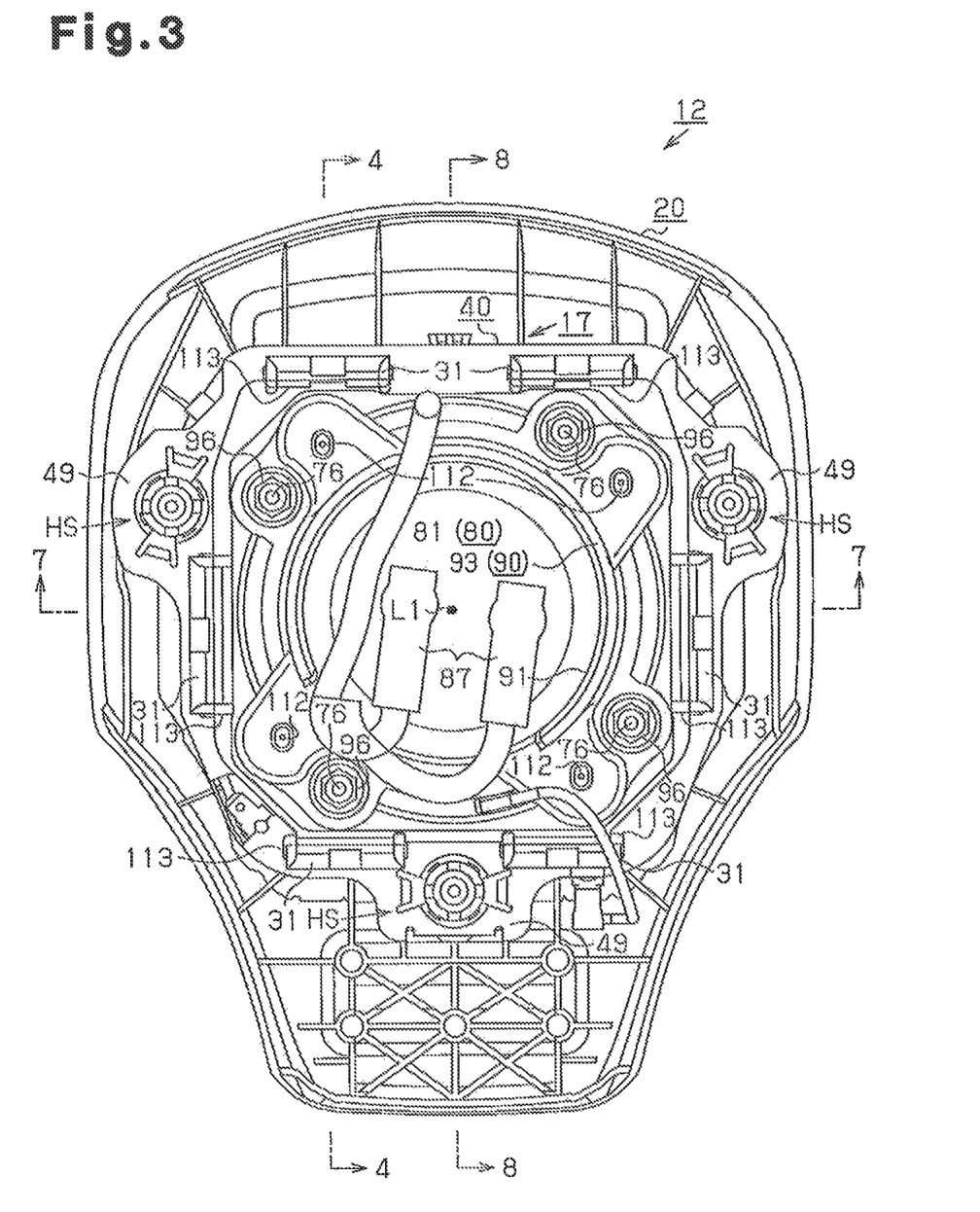
FIG. 3 is a rear view illustrating a part of the steering wheel in which an airbag apparatus is incorporated.
Figure 4:
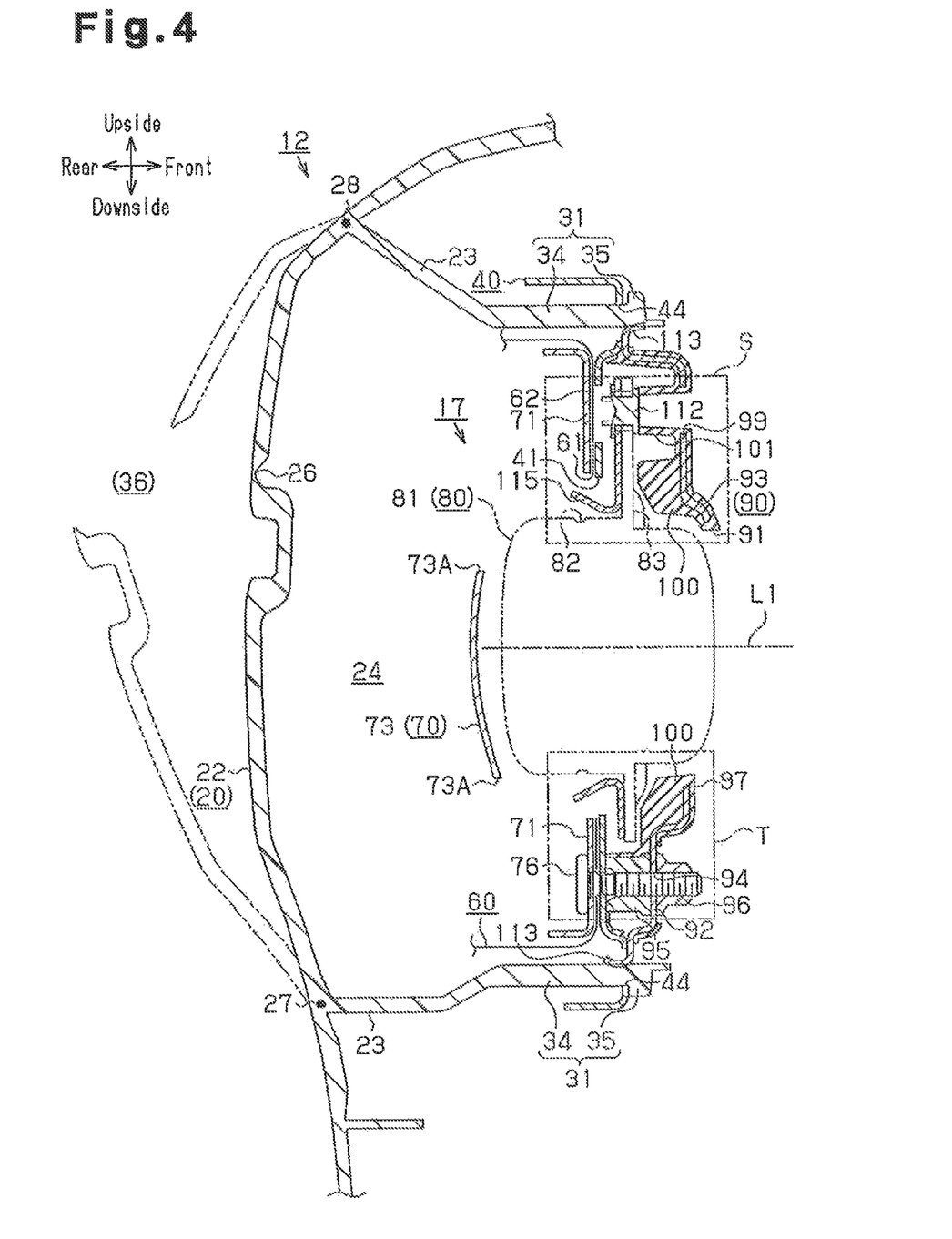
FIG. 4 is a cross-sectional view taken along line 4-4 of FIG. 3, illustrating the steering wheel.

In addition to the core 15, an airbag apparatus 17 is located in the space surrounded by the pad cover 20 and the lower cover 14 as shown in FIGS. 3 and 4 When an impact is applied to the vehicle from front due to, for example, a frontal collision, the airbag apparatus 17 causes an inflator 80, which is a gas generator, to supply gas to an airbag 60 to inflate the airbag 60 in front of the driver to absorb the impact applied to the driver. The airbag apparatus 17 includes a vibration suppression structure for suppressing vibration of the steering wheel 12.

In addition to the above described pad cover 20, inflator 80, and airbag 60, the airbag apparatus 17 includes a bag holder 40, a cup retainer 70, a support plate 90, and a gas plate 115. Among these, the bag holder 40 forms a framework of the airbag apparatus 17, and the other components are attached to the bag holder 40. The pad cover 20, which is one of the components of the pad portion of the steering wheel 12, also functions as a component of the airbag apparatus 17. These components of the airbag apparatus 17 apparatus will now be described.

<Bag Holder 40>

The bag holder 40 is formed by pressing a metal plate. The bag holder 40 has a circular insertion hole 41 at the center and has a rectangular shape as viewed from front (refer to FIG. 3). The bag holder 40 has six rectangular securing holes 44 about the insertion hole 41.

As shown in FIGS. 3 and 8, the bag holder 40 has three attachment portions 49 about the insertion hole 41. Each attachment portion 49 has an attachment hole 48 and extends outward with respect to the radial direction of the steering shaft 11, A horn switch mechanism MS for activating a horn device (not shown) mounted on the vehicle is attached to the attachment hole 48 of each attachment portion 49. Each horn switch mechanism HS is supported by the core 15 of the steering wheel 12. Accordingly, the airbag apparatus 17 is in a floating state with respect to the core 15 and can be moved (displaced) in the front-rear direction in accordance with deformation of the horn switch mechanisms HS.

Bolt holes 51 are formed at four positions about the insertion hole 41 in the bag holder 40. The bolt holes 51 are separated at equal angular intervals (90 degrees, see FIG. 6).

<Pad Cover 20>

Figure 7:
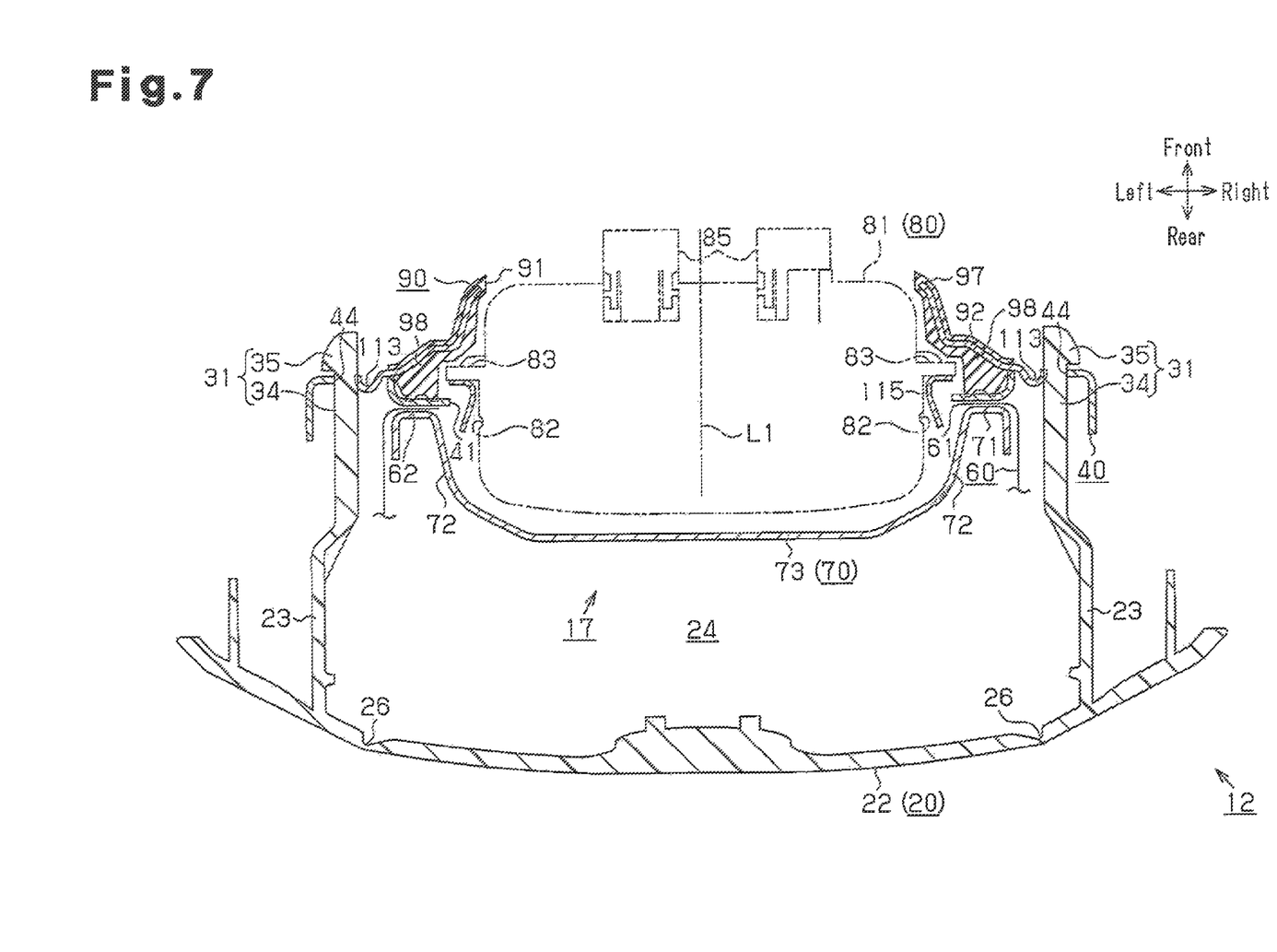
FIG. 7 is a cross-sectional view taken along line 7-7 of FIG. 3, illustrating the steering wheel.

As shown in FIGS. 4, 7 and 8, the pad cover 20 includes a lid 22 and an annular accommodating wall 23, which extends forward from the lid 22. The pad cover 20 is made of synthetic plastic and is arranged behind the bag holder 40. An accommodating space 24 is formed between the pad cover 20 and the bag holder 40.

The lid 22 has linear breakable portion 26 (hereinafter, referred to as tear line) on the front surface (inner surface, refer to FIG. 2). A part of the lid 22 where the tear line 26 is formed is thinner than the remainder of the lid 22 and therefore has lower strength. Thus, when the airbag 60 is deployed and inflated, the lid 22 is broken at the tear line 26. The pad cover 20 has hinge portions 27, 28, which function as fulcrums about which the lid 22 opens (rotates) when broken along the tear line 26. In FIG. 4, the hinge portions 27, 28 are indicated by dots (•).

The accommodating wall 23 has six securing portions 31. Each securing portion 31 includes a rectangular-plate like main body 34 and a claw portion 35, which is located in front of the main body 34 and protrudes outward in the radial direction of the steering shaft 11. In each securing portion 31, the claw portion 35 is located forward of the bag holder 40 and outward of the securing hole 44 in the radial direction of the steering shaft 11. The positional relationship between the claw portions 35 and the securing holes 44 causes the pad cover 20 to be secured to the bag holder 40, so that rearward movement of the pad cover 20 is restricted.

The maximum thickness of each securing portions 31 (the thickness of the claw portion 35) is slightly smaller than the width of the securing hole 44. This structure is required for allowing the securing portions 31 to be inserted into the securing holes 44.

The structure of the securing portions 31 may be changed as necessary as long as the securing portions 31 can be inserted into and secured to the securing holes 44.

<Airbag 60>

The airbag 60 is a bag that is inflated by gas and made of fabric having high strength and flexibility such as woven cloth. The airbag 60 has such a size that it occupies a large space between the steering wheel 12 and the driver when inflated.

The airbag 60 has at its front end an opening 61. A part of the airbag 60 that annularly surrounds the opening 61 (hereinafter, a peripheral portion 62) is formed to have a higher strength than the other parts of the airbag 60. The peripheral portion 62 has four bolt holes 63 about the opening 61. The bolt holes 63 are separated at equal angular intervals (90 degrees, see FIG. 6). The peripheral portion 62 is located behind the bag holder 40.

Although not illustrated, a large part of the airbag 60 except for the peripheral portion 62 is folded into a compact form and arranged in the accommodating space 24.

<Cup Retainer 70>

The cup retainer 70 is formed by pressing a metal plate. The cup retainer 70 includes a bag attachment portion 71, a plurality of arch portions 72, and a cover portion 73. The cup retainer 70 is inserted into the airbag 60 via the opening 61.

The bag attachment portion 71 is an annular portion forming the main part of the cup retainer 70. Most of the bag attachment portion 71 is formed like a flat plate and is located behind the peripheral portion 62 of the airbag 60. Four bolts 76, which are separated at equal angular intervals (90 degrees), are inserted and fixed to the bag attachment portion 71.

Figure 6:
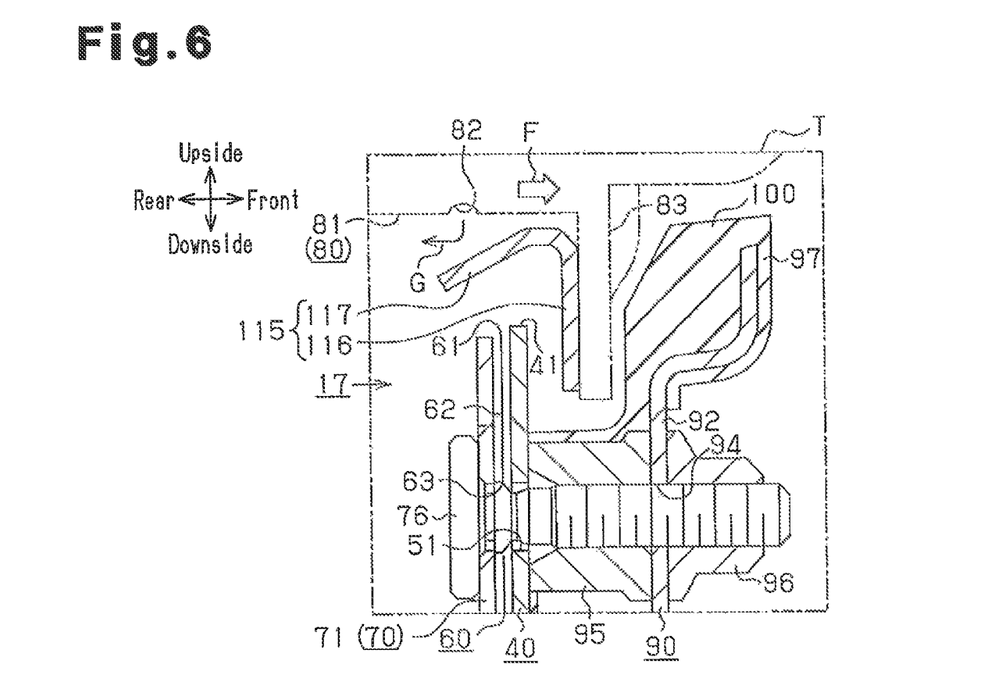
FIG. 6 is an enlarged cross-sectional view illustrating region T of FIG. 4.

As shown in FIGS. 6 and 7, the bolts 76 extend forward from the bag attachment portion 71 to be inserted into the bolt holes 63 of the airbag 60 and the bolt holes 51 of the bag holder 40. By inserting the bolts 76 to the bolt holes 63 of the airbag 60, the airbag 60 is secured to the cup retainer 70 via the bolts 76. By inserting the bolts 76 to the bolt holes 51 of the bag holder 40, the cup retainer 70 is secured to the bag holder 40. In a state in which the bolts 76 are inserted into the bolt holes 63, 51, the peripheral portion 62 of the airbag 60 is sandwiched between the bag holder 40 and the bag attachment portion 71 of the cup retainer 70.

The arch portions 72 extend rearward from the inner rim of the bag attachment portion 71. The arch portions 72 are arranged circumferentially while being separated apart from one another. The cover portion 73 is located behind and separated apart from the bag attachment portion 71. The rear ends of the arch portions 72 are connected to the cover portion 73. The cover portion 73 has a plurality of gas ports 73A.

<Inflator 80>

As shown in FIGS. 4, 7 and 8, the main portion of the inflator 80 is formed by a columnar main body 61 the center of which coincides with the rotation axis L1 of the steering shaft 11. The main body 81 has an outer diameter that is smaller than any of the diameter of the insertion hole 41 of the bag holder 40, the diameter of the opening 61 of the airbag 60, and the diameter of the space surrounded by the bag attachment portion 71 in the cup retainer 70. A rear portion of the main body 81 is inserted into the insertion hole 41 and the opening 61.

The main body 31 accommodates a gas generating agent (not shown), which generates gas G for inflating the airbag 60. A plurality of gas ejection holes 82 are formed on the outer circumferential surface of the main body 81 at equal angular intervals.

Figure 5:
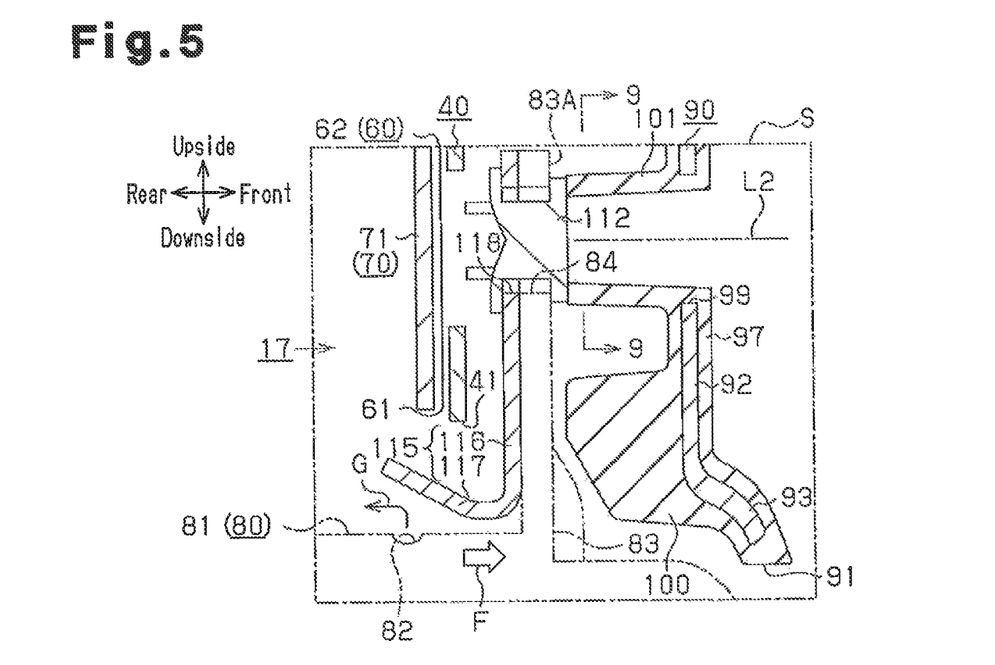
FIG. 5 is an enlarged cross-sectional view illustrating region S of FIG. 4.

A flange 83 is formed on the entire outer circumferential surface of the main body 81, at a position forward of the gas ejection holes 82 and forward of the insertion hole 41 of the bag holder 40. As shown in FIG. 5, the flange 83 has four attachment pieces 83A located about the main body 81. The attachment pieces 83A protrude further radially outward than the other parts of the flange 33. A fastener hole (rivet hole) 84 is formed in each attachment piece 83A.

As shown in FIGS. 3 and 7, a connector 85 is assembled to the front portion of the inflator 80, and a harness 87, through which an activation signal is input to the inflator 80, is connected to the connector 85.

In place of the type using the gas generating agent as shown above, it is possible to use, as the inflator 80, a type of inflator that breaks a partition wall of a high-pressure gas cylinder filled with a high-pressure gas by a low explosive so as to jet out the gas. The main body 81 of the inflator 80 may have any tubular shape other than a cylindrical shape.

<Support Plate 90>

The support plate 90 is designed to elastically support the inflator 80. As shown in FIGS. 3 and 4, the support plate 90 has a through hole 91 in the center for drawing out the harness 87 connected to the connector 85 of the inflator 80 to a position forward of the support plate 90.

The framework of the support plate 90 is formed by an annular support base 92 and an arcuate cover portion 93, which are formed by pressing metal plates. The support base 92 forms most part of the support plate 90 that includes an outer portion in the radial direction of the steering shaft 11. The cover portion 93 is located inward of the support base 92 with respective to the radial direction to cover the front peripheral portion of the inflator 80 without contacting.

As shown in FIG. 6, most part of the support base 92 is located in front of the of the bag holder 40. The support base 92 has four bolt holes 94 about the through hole 91. The bolt holes 91 are separated at equal angular intervals (90 degrees). Collar (a cylindrical spacer) 95 are arranged on the back side of the support base 92. Each collar 95 is located on the same axis as one of the bolt holes 94. The collars 95 form a part of the support plate 90 and are coated, together with the support base 92, with an elastic portion 97, to be integrated with the support base 92.

The bolts 76, which extend from the cup retainer 70 and through the bolt holes 63 of the airbag 60 and the bolt holes 51 of the bag holder 40, are inserted into the collars 95 and the bolt holes 94 of the support base 92. Nuts 96 are fastened to parts of the bolts 76 that protrude forward from the support base 92. Accordingly, the cup retainer 70 and the support base 92 are fastened to the bag holder 40. Also, the peripheral portion 62 of the opening 61 of the airbag 60 is sandwiched by the cup retainer 70 and the bag holder 40.

Most parts of the support base 92 and the cover portion 93 are coated with the elastic portion 97, which is formed by elastic materials such as synthetic rubber and elastomer. A part of the elastic portion 97 functions as an elastic protrusion 100, which protrudes rearward from an inner portion of the support base 92 with respect to the radial direction of the steering shaft 11. The elastic protrusion 100 surrounds and is separated from the main body 81 of the inflator 80. The elastic protrusion 100 is separated forward from the flange 83 of the inflator 80. As shown in FIG. 3, the support plate 90 has a sealing portion 98, which is a part of the elastic portion 97. The sealing portion 98 protrudes rearward from the support base 92 and contacts the bag holder 40 while being elastically deformed. The sealing portion 98 thus seals between the bag holder 40 and the support plate 90.

As shown in FIGS. 4 and 5, the support plate 90 has a structure for elastically supporting the inflator 80. Specifically, the support base 92 has four holes 99 about the through hole 91. The holes 99 are separated at equal angular intervals (90 degrees). The support base 92 has cylindrical elastic support portions 101, each of which extends rearward from the inner wall of a hole 99. The front end of each elastic support portion 101 is connected to the elastic portion 97.

The elastic support portions 101, together with the inflator 80, form a dynamic damper. When vibration the frequency of which is equal to the resonance frequency of the dynamic damper is transmitted to the dynamic damper from the steering wheel 12, the dynamic damper resonates to absorb vibration energy of the steering wheel 12. This suppresses the vibration of the steering wheel.

In the following, it is assumed that the dynamic camper of the steering wheel 12 is designed to suppress vibrations in two directions, for example, the up-down direction and the left-right direction, and that these vibrations have different frequencies. The following description will be made on the assumption that the frequency of the vibration in the left-right direction of the steering wheel 12 that is desired to be suppressed is higher than the frequency of the vibration in the up-down direction that is desired to be suppressed.

Figure 9:
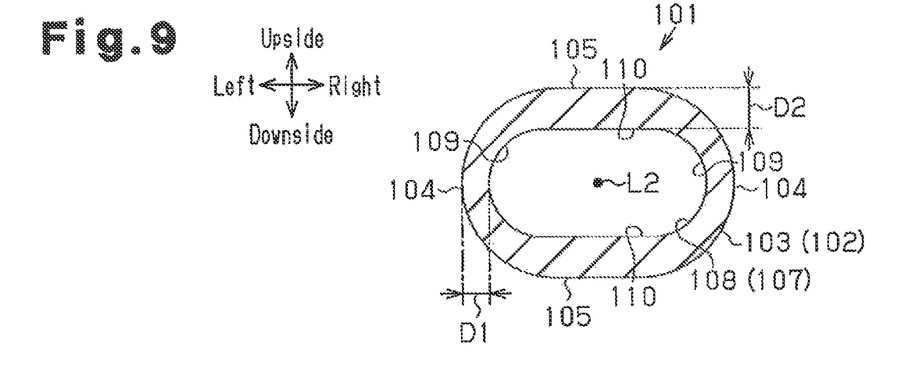
FIG. 9 is a cross-sectional view taken along line 9-9 of FIG. 5, illustrating the elastic support portion.

In the present embodiment, the shape of the elastic support portions 101 is designed to meet the demand, Each elastic support portion 101 is formed as a cylinder the axis L2 of which extends in the front-rear direction. FIG. 9 shows a cross section of one of the elastic support portions 101 in a direction orthogonal to the axis L2. Each elastic support portion 101 has an outer periphery 102 of the same oval 103 (or oblong) at any cross section orthogonal to the axis L2. The oval 103 includes a pair of left and right arcuate sections 104, which are separated and face each other, and a pair of upper and lower straight sections 105, which are parallel and extend in the left-right direction. The arcuate sections 104 bulge in opposite directions, and the straight sections 105 connect the ends of the arcuate sections 104 to each other. Also, each elastic support portion 101 has an inner periphery 107 of the same oval 108 at any cross section orthogonal to the axis L2. The oval 108 includes a pair of left and right arcuate sections 109, which are separated from and face each other, and a pair of upper and lower straight sections 110, which are parallel with each other and extend in the left-right direction. The arcuate sections 109 bulge in opposite directions, and the straight sections 110 connect the ends of the arcuate sections 109 to each other.

The distance between the outer periphery 102 and the inner periphery 107 in a direction along the straight sections 105, 110 of the ovals 103, 108 is denoted as D1, and the distance D2 between the outer periphery 102 and the inner periphery 107 in a direction orthogonal to the straight sections 105, 110 is denoted as D2. The distance D1 is the same on both sides in a direction along the straight sections 105, 110, and the distance D2 is the same on both sides in a direction orthogonal to the straight sections 105, 110. The distance D1 and the distance D2 are different from each other.

In the present embodiment, the distance between each arcuate section 104 of the outer periphery 102 and the corresponding arcuate section 109 of the inner periphery 107 is denoted as D1, and the distance between each straight section 105 of the outer periphery 102 and the corresponding straight section 110 of the inner periphery 107 is denoted as D2. The distance D1 is set to be smaller than the distance D2.

With the cross section of each elastic support portion 101 meeting the above conditions, the size of the cross section, the distances D1, D2, and the length (height) along the axis L2 are adjusted such that the resonance frequency in the up-down direction of the dynamic damper matches with or is brought close to the frequency desired to be suppressed in the vibration in the up-down direction of the steering wheel 12. Also, the resonance frequency of the dynamic damper in the left-right direction matches or is brought close to the frequency desired to be suppressed in the vibration in the left-right direction of the steering wheel 12 (a value higher than the frequency of the frequency to be suppressed in the up-down direction).

The elastic support portions 101 may be formed separately from the elastic portion 97. In this case, the elastic support portions 101 are fixed to the support base 92, for example, by vulcanized adhesion. Also, a circumferentially extending groove may be formed in the outer circumference of the front end of each elastic support portion 101, and the elastic support portion 101 may be secured to the support base 92 by fitting the elastic support portion 101 into the hole 99 of the support base 92 at the groove. In this case, the holes 99 restrict displacement of the elastic support portions 101 relative to the support base 92.

The outer shape (the outer surface) of the cylindrical elastic support portions 101 is formed by molding with a die, and its inner shape (the inner surface is formed by molding with a columnar pin. To facilitate release of the elastic support portion 101 from the pin, the hole 99 of the elastic support portion 101 is slightly inclined relative to the axis L2 such that the cross-sectional area of the elastic support portion 101 decreases toward the rear end from the hole 99.

As shown in FIG. 5, a metal rivet 112 is fixed to the rear end face of each elastic support portion 101, for example, by vulcanized adhesion. The rear portion of the rivet 112 is cylindrical with an open rear end, and is inserted into the fastener hole (the rivet hole) 84 formed in each of the attachment pieces 83A of the flange 83. The inserted rivets 112 secure the flange 83 with the elastic support portions 101.

As shown in FIGS. 4 and 7, pressing pieces 113 are formed by bending an outer periphery of the support base 92 of the support plate 90. Specifically, parts that correspond to the securing portions 31 and the securing holes 84 are bent rearward or forward to form the pressing pieces 113. The pressing pieces 113 contact the securing portions 31 from inside in the radial direction of the steering shaft 11, thereby pushing the securing portions 31 against the inner wall of the securing holes 44. The pressing pieces 113 may contact the securing portions 31 from outside in the radial direction of the steering shaft 11.

The support plate 90 also has the following functions.

(i) A function to receive the inflator 80 when it is moved forward excessively.

(ii) A function to prevent a middle portion of the harness 87 in the longitudinal direction from contacting the inflator 80, thereby reducing the likeliness of the vibration of the inflator 80 being hindered by contact with the harness 87.

<Gas Plate 115>

As illustrated in FIGS. 5 and 6, the gas plate 115 is formed by pressing a metal plate. The gas plate 115 has an attachment base 116 and a pressure receiving portion 117.

The attachment base 116 is substantially annular and is located rearward of the flange 83 of the inflator 80 and in front of the gas ejection holes 82. Fastening through holes 118 are formed at a plurality of (four) positions in the circumferential direction of the attachment base 116 at equal angular intervals (90 degrees). The fastening through holes 118 receive the rear end of the rivets 112.

As indicated by a broken line in which a long dash alternates with a pair of short dashes in FIG. 5, the rear end of each rivet 112 is exposed to the rear from the gas plate 115. The exposed portion of each rivet 112 is collapsed (swaged) as indicated by solid lines in FIG. 5. Accordingly, the diameter of the rivet 112 is enlarged, and the rivet 112 is fixed to the flange 83. Also, the enlarged diameter portions of the rivets 112 and the flange 83 hold the attachment base 116 of the gas plate 115 in between. In this manner, the inflator 80, together with the gas plate 115, is fastened to the elastic support portions 101 via the rivets 112. The inflator 80 is elastically supported by the support plate 90 and the bag holder 40 via the elastic support portions 101.

The holes 99 of the support plate 90 are used as insertion holes for a jig (not shown) that receives each rivet 112 from front when the rivet 112 is collapsed.

The gas plate 115 may be fixed to the flange 83 at positions other than positions where the flange 83 is fastened to elastic support portions 101.

In the radial direction of the steering shaft 11, the pressure receiving portion 117 of the gas plate 115 is located between the gas ejection holes 82 of the inflator 80 and the peripheral portion 62 of the airbag 60. The pressure receiving portion 117 is designed to change the direction of the gas G, which has been ejected radially outward of the main body 81 from the gas ejection holes 82, into the rearward direction. The pressure receiving portion 117 also receives the pressure of the gas G to generate forward acting force F. The pressure receiving portion 117 is formed by bending a part of the gas plate 115 at the inner rim of the attachment base 116. The pressure receiving portion 117 is tapered such that the pressure receiving portion 117 is separated farther away from the main body 81 of the inflator 80 toward the rear end.

The pressure receiving portion 117 may be formed as a part of the flange 83 in the inflator 80. The pressure receiving portion 117 may be directly attached to the inflator 80.

Operation of the above described embodiment will now be described.

According to the steering wheel 12 of the present embodiment, when the driver presses the pad cover 20 forward, the bag holder 40 is displaced forward together with other components of the airbag apparatus 17. Accordingly, the circuit of the horn switch mechanism HS is closed to activate the horn device to generate sound.

Unless impact is applied to the vehicle from front (frontal collision), the gas G is not ejected from the gas ejection holes 82 of the inflator 80, and the airbag 60 remains folded.

When the vehicle traveling at a high speed or the engine is idling with the airbag 60 in a non-inflated state, vibration in the up-down direction and left-right direction may be transmitted through the steering shaft 11. The vibration is transmitted to the inflator 80 via the bag holder 40, the elastic support portions 101 and others in the airbag apparatus 17. At this time, as shown in FIGS. 5 and 6, the flange 83 of the inflator 80 is separated rearward from the elastic protrusion 100 of the support plate 90, and the clearance between the flange 83 and, the elastic protrusion 100 allows the inflator 80 to vibrate.

In response to the vibration, the inflator 80 of the airbag apparatus 17 functions as a damper mass of a dynamic damper, and the elastic support portions 101 of the support plate 90 function as springs of the dynamic damper.

As shown in FIG. 9, each of the cylindrical elastic support portions 101 has the outer periphery 102, which is formed as the oval 103, and the inner periphery 107, which is formed as the oval 108. The oval 103 is formed by the pair of arcuate sections 104 and the pair of straight sections 105, and the oval 108 is formed by the pair of arcuate sections 109 and the pair of straight sections 110. The dimension of each elastic support portion 101 is greater in a direction along the straight sections 105, 110 (the left-right direction) than in a direction orthogonal to the straight sections 105, 110 (the up-down direction). Therefore, the rigidity of the elastic support portion 101 in the direction along the straight sections 105, 110 (the left-right direction) is higher than the rigidity of the elastic support portion 101 in the direction orthogonal to the straight sections 105, 110 (the up-down direction). Accordingly, the resonance frequency of each elastic support portion 101 is higher in the direction along the straight sections 105, 110 than in the direction orthogonal to the straight sections 105, 110. Further, each elastic support portion 101 has the inner periphery 107 and the outer periphery 102, each of which forms the same oval at any cross section orthogonal to the axis L2. This increases the difference in rigidity between the left-right direction and the up-down direction of each elastic support portion 101, so that the difference between the resonance frequencies is enlarged.

Particularly, in the present embodiment, the outer periphery 102 and inner periphery 107 are formed such that the distance D1 between the arcuate sections 104, 109 and the distance D2 between the straight sections 105, 110 are different from each other (D1<D2). Therefore, compared to a structure in which the distances D1, D2 of the ovals 103, 108 are uniform and there is no difference between the distance D1 and the distance D2 in the direction along the straight sections 105, 110 and the direction orthogonal thereto, the rigidity of the elastic support portion 101 in the direction along the straight sections 105, 110 (the left-right direction) is further increased relative to the rigidity of the elastic support portion 101 in the direction orthogonal thereto (the up-down direction). The resonance frequency of each elastic support portion 101 in the direction along the straight sections 105, 110 (the left-right direction) is further increased relative to the resonance frequency in the direction orthogonal thereto (the up-down direction).

Therefore, when vibration in the direction along the straight sections 105, 110 of the ovals 103, 108 (the left-right direction) is applied to the dynamic damper from the steering wheel 12, and the frequency of the vibration is the same as or close to the high resonance frequency in the same direction, each elastic support portion 101 is elastically deformed at that resonance frequency in the left-right direction. The elastic support portions 101 vibrate (resonate) in the left-right direction with the inflator 80 and the gas plate 115, thereby absorbing the vibration energy in the left-right direction of the steering wheel 12. Due to such energy absorption, the vibration of the steering wheel 12 in the left-right direction is damped (suppressed).

When vibration in the direction orthogonal to the straight sections 105, 110 of the ovals 103, 108 (the up-down direction) is applied to the dynamic damper from the steering wheel 12, and the frequency of the vibration is the same as or close to the low resonance frequency in the same direction, each elastic support portion 101 is elastically deformed at that resonance frequency in the up-down direction. The elastic support portions 101 vibrate (resonate) in the left-right direction with the inflator 80 and the gas plate 115, thereby absorbing the vibration energy in the left-right direction of the steering wheel 12. Due to such energy absorption, the vibration of the steering wheel 12 in the up-down direction is damped (suppressed).

In the present embodiment, there are two directions of vibrations of the steering wheel 12 that are desired to be suppressed (the up-down direction and the left-right direction), and the target frequencies of such vibrations are largely different from each other. However, the dynamic damper of the present embodiment is capable of damping (suppressing) the vibrations of both directions.

In airbag apparatus 17, the cup retainer 70 is located outward of the inflator 80. The cup retainer 70 restricts movement of the airbag 60 and reduces interference between the airbag 60 and the inflator 80. Therefore, vibration of the inflator 80 is unlikely to be hindered by the airbag 60.

Incidentally, when an impact is applied to the vehicle, for example, due to a frontal collision, the body of the driver acts to incline forward due to the inertia. At the same time, the inflator 80 of the airbag apparatus 17 is activated in response to the impact, so that the gas C is ejected radially outward from the gas ejection holes 82.

The ejected gas C hits the pressure receiving portion 117, which is inclined to be separated from the main body 81 toward the rear end, so that the direction of flow is changed from a radially outward direction with respect to the steering shaft 11 to the rearward direction, as indicated by the arrow of the solid line in FIGS. 5 and 6. After its flowing direction is changed, the gas C is supplied to the interior or the airbag 60. The gas C causes the airbag 60 to inflate rearward (toward the driver) while being unfolded (deployed). The airbag 60 applies rearward pressing force to the lid 22 the pad cover 20.

The pressure of the gas C from the gas ejection holes 82 is received by the inclined pressure receiving portion 117, so that a forward force F is generated in the pressure receiving portion 117 as indicated by the blank arrows in FIGS. 5 and 6. Immediately after the gas G starts being ejected from the gas ejection holes 82, the force F moves the inflator 80 forward, so that the inflator 80 elastically deforms the elastic support portions 101 and then contacts the elastic protrusion 100. Accordingly, the clearance between the inflator 80 and the support plate 90 is sealed to reduce leakage of gas through the through hole 91.

When the airbag 60 is inflated inside the accommodating space 24, the inflation is limited by the pad portion. The internal pressure of the airbag 60 is therefore rapidly raised as time elapses. The gas G applies forward moving force to the inflator 80. The forward moving force and the above described force F of the pressure receiving portion 117 cause the inflator 80 to be strongly pressed against the elastic protrusion 100.

When the pressing force acting on the lid 22 of the pad cover 20 is increased by the airbag 60 being deployed and inflated, the lid 22 is broken at the tear line 26. As indicated by broken lines in which a long dash alternates with a pair of short dashes, the lower half of the broken lid 22 is opened downward (rotated) at the hinge portion 27 serving as a fulcrum, and the upper half is opened upward (rotated) at the hinge portion 28 serving as a fulcrum.

Rotation of the halves of the lid 22 creates an opening 36. The airbag 60 continues being deployed and inflated rearward through the opening 36. The airbag 60 is thus deployed and inflated in front of the body of the driver, which acts to incline forward due to the impact of the frontal collision, and receives the body of the driver to limit the forward inclining motion of the driver, thereby protecting the driver from the impact.

The present embodiment described above has the following advantages.

Each elastic support portion 101 has a cylindrical shape extending in the front-rear direction. Each elastic support portion 101 has the outer periphery 102 and the inner periphery 107, which have the same ovals 103 and 108, respectively, at any cross section orthogonal to the axis L2 (FIG. 9). Therefore, the structure of each elastic support portions 101 allows the rigidity in the direction along the straight sections 105, 110 of the ovals 103, 108 and the rigidity in the direction orthogonal to the straight sections 105, 110 to be largely different from each other, so that the resonance frequencies in the two directions are great. As a result, vibrations in the above two directions having two greatly different frequencies can be suppressed in the steering wheel 12.

The distance D1 between the arcuate section 104 of the outer periphery 102 and the arcuate section 109 of the inner periphery 107 is different from the distance D2 between the straight section 105 of the outer periphery 102 and the straight section 110 of inner periphery 107 (FIG. 9). Therefore, compared to a structure in which the distance between the ovals 103, 108 in a cross section of each elastic support portion 101 is constant and there is no difference between the distances D1, D2 in the direction along the straight sections 105, 110 and the direction orthogonal thereto, the resonance frequency in the direction along the straight sections 105, 110 of the ovals 103, 103 and the resonance frequency in the direction orthogonal to the straight section 105, 110 can be further increased.

The present invention may be embodied in the following forms.

<Regarding Elastic Support Portions 101>

The elastic support portions 101 may be located at positions in the support plate 90 that are different from those described in the above embodiment. The number of the elastic support portions 101 in the support plate 90 may be changed.

The elastic support portions 101 may have any cross-sectional shape different from that in the above described embodiment unless the outer periphery 102 and inner periphery 107 are both circular. Examples are shown in FIGS. 10(A) to 10(C).

Figure 10A:
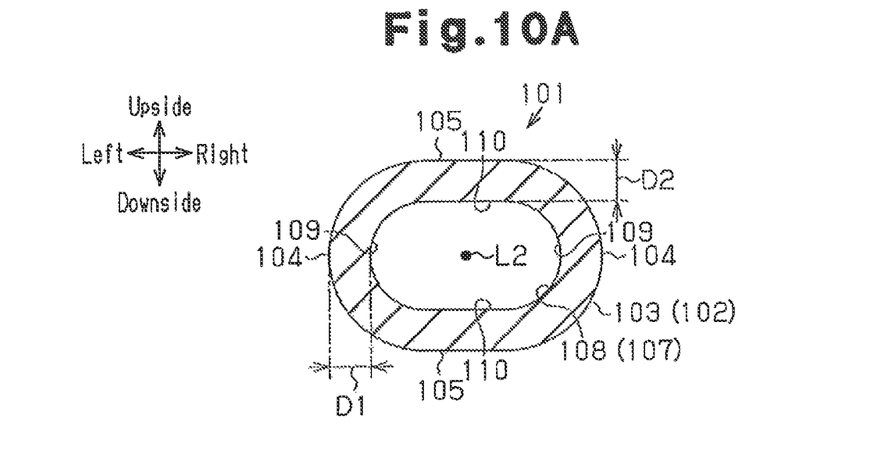
FIGS. 10(A) to 10(C) are cross-sectional views corresponding to FIG. 9, illustrating modifications of elastic support portions.

FIG. 10(A) shows a modification in which the outer periphery 102 and the inner periphery 107 are both shaped as ovals 103, 108, and the distance D1 and the distance D2 are the same. The distance D1 is the distance between the arcuate section 104 and the arcuate section 109, and the distance D2 is the distance between the straight section 105 and the straight section 110. In this case, there is no difference between the distances D1 and D2 with respect to the direction along the straight sections 105, 110 and the direction orthogonal thereto. However, since the dimension in the direction along the straight sections 105, 110 is greater than the dimension in the direction orthogonal to the straight sections 105, 110, the rigidity of the elastic support portion 101 in the direction along the straight sections 105, 110 is higher than the rigidity of the elastic support portion 101 in the direction orthogonal to the straight sections 105, 110. The resonance frequency of each elastic support portion 101 is higher in the direction along the straight sections 105, 110 than in the direction orthogonal to the straight sections 105, 110.

Figure 10B:
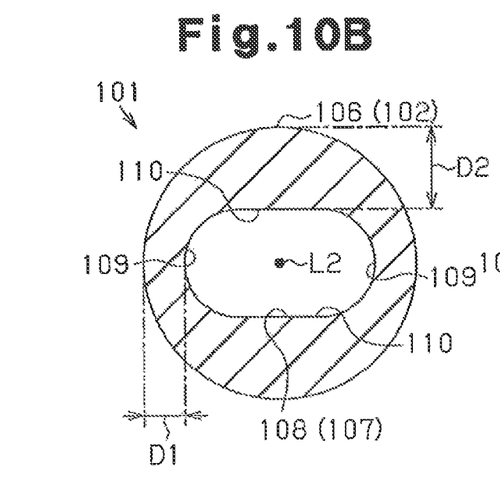

FIG. 10(B) shows a modification in which the outer periphery 102 is shaped as a circle 106 and the inner periphery 107 is shaped as an oval 108, and the distance D1 and the distance D2 are different from each other. The distance DI is the distance between the arcuate section 109 of the oval 108 and the circle 106, and the distance D2 is the distance between the straight section 110 of the oval 108 and the circle 106. In this case, the rigidity of the elastic support portion 101 in the direction along the straight sections 110 of the oval 108 is different from the rigidity of the elastic support portion 101 in the direction orthogonal to the straight sections 110. Accordingly, the resonance frequency of the elastic support portion 101 in the direction along the straight section 110 is different from the resonance frequency in the direction orthogonal to the straight section 110. Further, the distance D1 between the arcuate section 109 of the oval 108 and the circle 106 is different from the distance D2 between the straight section 110 of the oval 108 and the circle 106. This increases the difference in rigidity between these directions of the elastic support portion 101, so that the difference between the resonance frequencies is further enlarged.

Figure 10C:
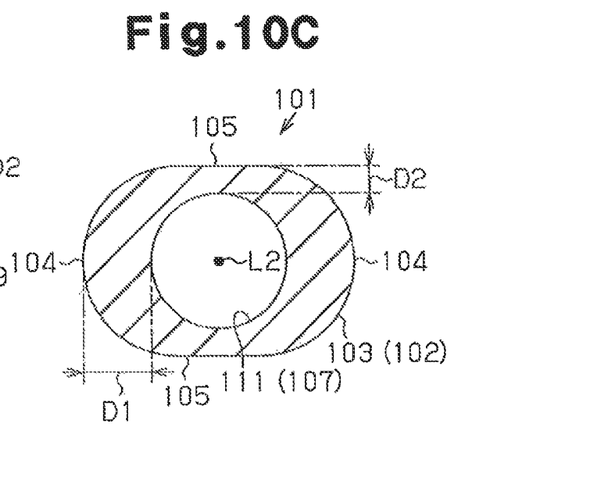

FIG. 10(C) shows a modification in which the outer periphery 102 is shaped as an oval 103 and the inner periphery 107 is shaped as a circle 111, and the distance D1 and the distance D2 are different from each other, The distance D1 is the distance between the arcuate section 104 of the oval 103 and the circle 111, and the distance D2 is the distance between the straight section 105 of the oval 103 and the circle 111, in this case, the rigidity of the elastic support portion 101 in the direction along the straight sections 105 of the oval 103 is different from the rigidity of the elastic support portion 101 in the direction orthogonal to the straight sections 105. Accordingly, the resonance frequency of the elastic support portion 101 in the direction along the straight section 105 of the oval 103 is different from the resonance frequency in the direction orthogonal to the straight section 105. Further, the distance D1 between the arcuate section 104 of the oval 103 and the circle 111 is different from the distance D2 between the straight section 105 of the oval 103 and the circle 111. This increases the difference in rigidity between these directions of the elastic support portion 101, so that the difference between the resonance frequencies is further enlarged.

Regarding the above illustrated embodiment and the modifications illustrated in FIGS. 10(A) to 10(C), the following advantages related to manufacturing facility for the elastic support portions 101 are achieved if the elastic support portions 101 to be manufactured have the same outer shapes but different inner shapes. That is, the same die for forming the outer shape can be used for all the elastic support portions 101, while only the pin for forming the inner shape needs to be changed in accordance with the inner shape (the inner periphery in the cross section) of the elastic support portion 101.

The position of each elastic support portion 101 (the rotational phase about the axis L2 in the support plate 90 may be changed. Specifically, the direction in which the straight sections 105, 110 extend in the ovals 103, 108 and the direction orthogonal thereto are not limited to the up-down direction and the left-right direction, but may be varied as necessary in accordance with the directions of vibrations desired to be suppressed (two directions orthogonal to each other) and the frequencies of such vibrations.

<Other Modifications>

At least one of the bag holder 40, the cup retainer 70, the support plate 90, and the gas plate 115 may be formed by a method other than pressing, for example, by die casting.

The steering wheel 12 is not limited to the "floating type", but may be a "rigid type", in which the pad portion is directly fixed to the core 15 and does not swing. In this case, the same advantages as the above illustrated embodiment are achieved.

The present invention may be applied not only to the steering wheel incorporating an airbag apparatus in motor vehicles, but may also be applied to steering wheels of other transport vehicles such as aircrafts and ships. Motor vehicles include not only passenger vehicles, but also industrial vehicles of various types.

The invention claimed is:

1. A vibration suppression structure adapted for a steering wheel that is rotated about a steering shaft having a longitudinal direction and incorporates an airbag apparatus including an airbag and an inflator for supplying gas to the airbag, the vibration suppression structure comprising:
    an elastic support portion for elastically supporting the inflator such that the inflator functions as a damper mass of a dynamic damper and the elastic support portion functions as a spring of the dynamic damper, wherein
    the elastic support portion is formed as a cylinder having an axis extending in the longitudinal direction,
    at any cross section orthogonal to the axis, the elastic support portion has an outer periphery of the same oval or the same circle and an inner periphery of the same oval or the same circle,
    when the outer periphery is circular, the inner periphery is oval, and when the inner periphery is circular, the outer periphery is oval.

2. The vibration suppression structure according to claim 1, wherein
    at any cross section orthogonal to the axis, the elastic support portion has an outer periphery of the same oval and an inner periphery of the same oval, and the distance between the outer periphery and the inner periphery is constant.

3. The vibration suppression structure according to claim 1, wherein
    at any cross section orthogonal to the axis, the elastic support portion has an outer periphery of the same oval and an inner periphery of the same oval, the ovals of the outer periphery and the inner periphery each having a pair of arcuate sections and a pair of straight sections connecting the arcuate sections to each other, and
    the distance between the arcuate sections of the outer periphery and the arcuate sections of the inner periphery is different from the distance between the straight sections of the outer periphery and the straight sections of the inner periphery.

4. The vibration suppression structure according to claim 1, wherein
    at any cross section orthogonal to the axis, the elastic support portion has an outer periphery of the same circle and an inner periphery of the same oval having a pair of arcuate sections and a pair of straight sections connecting the arcuate sections to each other, and
    the distance between the outer periphery and the arcuate sections of the inner periphery is different from the distance between the or periphery and the straight sections of the inner periphery.

5. The vibration suppression structure according to claim 1, wherein
    at any cross section orthogonal to the axis, the elastic support portion has an inner periphery of the same circle and an outer periphery of the same oval having a pair of arcuate sections and a pair of straight sections connecting the arcuate sections to each other, and
    the distance between the inner periphery and the arcuate sections of the outer periphery is different from the distance between the inner periphery and the straight sections of the outer periphery.

* * * * *